United States Patent [19]

Furrow

[11] Patent Number: 5,013,434

[45] Date of Patent: May 7, 1991

[54] FLUID FILTER CARTRIDGE SUPPORT HOUSING

[75] Inventor: Roger W. Furrow, High Point, N.C.

[73] Assignee: Gilbarco, Inc., Greensboro, N.C.

[21] Appl. No.: 508,008

[22] Filed: Apr. 10, 1990

[51] Int. Cl.⁵ ............................................ B01D 27/08
[52] U.S. Cl. .................................. 210/232; 210/440; 210/443; 210/DIG. 17
[58] Field of Search ............... 210/232, 238, 440, 443, 210/DIG. 17

[56] References Cited

U.S. PATENT DOCUMENTS

| | | | |
|---|---|---|---|
| 4,406,784 | 9/1973 | Cochran | 210/168 |
| 4,626,344 | 12/1986 | Fick et al. | 210/90 |
| 4,637,874 | 1/1987 | Ansteth | 210/232 |
| 4,701,258 | 10/1987 | Billiet et al. | 210/232 |
| 4,725,354 | 2/1988 | Thomsen | 210/232 |

Primary Examiner—Robert A. Dawson
Assistant Examiner—Wanda L. Millard
Attorney, Agent, or Firm—Rhodes, Coats & Bennett

[57] ABSTRACT

A filter cartridge support housing is provided with a peripheral skirt which extends below or beyond the interface between the filter cartridge and its support housing to deflect or divert fuel or vapor, which may escape through the interface, in a desired direction.

1 Claim, 2 Drawing Sheets

FLUID FILTER CARTRIDGE SUPPORT HOUSING

BACKGROUND AND SUMMARY OF THE PRESENT INVENTION

The present invention is directed to fluid filters and, more particularly, to the support housings for fuel filters which will deflect escaping fuel and vapors in a desired direction.

In the dispensing of the fuel, as for example at service stations, fuel is pumped from an underground tank and delivered through appropriate valves, metering devices, and conduits to a dispenser nozzle. Service stations are generally provided with fuel dispensers or multiple product fuel dispensing unit which are housings that contain the pumps or flow control valves, metering devices, and conduits which perform the dispensing function.

It is commonplace at some point in the dispenser to provide a filter cartridge through which the fuel passes to separate any dirt, debris, or contaminates which may be in the fuel and which would otherwise tend to clog the passageways in the fuel dispenser and the fuel line in to the automobiles. Such fuel filters generally include a support housing to which a filter cartridge is releasably attached. The releasable attachment is necessary because the filter cartridge must be periodically replaced when the filter media becomes dirty and clogged.

Quite commonly, such a fuel cartridge support housing will be mounted in the fuel dispenser much the same as an oil filter for an automobile engine. A support housing is incorporated in the fuel line from the fuel tanks to the dispenser nozzle and releasably supports a filter cartridge. The cylindrical filter cartridge is easily accessible and is merely replaced by unscrewing the spent cartridge and spinning on a new cartridge. The attachment between the filter cartridge and support housing is generally a threaded conduit that serves to both mount the cartridge and provide a passageway for filtered fuel.

A serious problem has arisen in such types of fuel filter systems. According to operating procedures, when it is desired to replace a spent filter cartridge, the operator should first shut off the pumps which maintain fuel under pressure in the fuel conduits. Then the cartridge is removed and replaced. Should the operator inadvertently forget to first turn off the fuel supply, as the filter cartridge is loosened, fuel or vapors under pressure therefrom will be emitted. This can be quite dangerous and should be avoided.

According to the present invention, this problem is minimized by simply providing a peripheral skirt which depends from the filter cartridge support housing below or beyond the interface between the fuel cartridge and the support housing. Thus, should the operator inadvertently fail to shut off the fuel supply, any fuel and/or vapors emitted will be deflected from the interface downwardly or in a desired direction as the filter cartridge is loosened.

The present invention, in general, is directed to a fuel filter mounting support including a support housing with attachment means on the lower side thereof for releasably receiving a filter cartridge. A peripheral skirt extends downwardly from the housing below the point at which the lower surface of the housing is engaged by an assembled fuel cartridge. The support housing includes a means for attachment thereof to a fuel conduit and an inlet means for the ingress of fuel to be filtered and an outlet for the delivering of filtered fuel back to the conduit. First and second passageways extend through the housing, the first passageway providing communication between the fuel inlet and an outlet port on the lower side of the housing which delivers the unfiltered fuel into the filter cartridge. The second passageway extends internally of the housing between a return inlet port from the filter cartridge for filtered fuel on the lower side of the housing and communicates with the return outlet which delivers the filtered fuel back to the conduit.

It is therefore an object of the present invention to provide a fuel filter mounting support that prevents an uncontrolled outward expulsion of fuel and vapors upon inadvertent loosening of the fuel cartridge.

Another object of the present invention is to provide a fuel filter mounting support of the type described in which the outward expulsion of fuel and vapors is prevented by a peripheral skirt which overlies the interface between the fuel cartridge and the support housing.

Other objects and a fuller understanding of the invention will become apparent from reading the following detailed description of the preferred embodiment along with the accompanying drawings in which:

FIG. 1 is a perspective view of the fuel cartridge mounting support in a typical environment; and FIG. 2 is a sectional view of the mounting support with a fuel cartridge attached and illustrating schematically the flow of fuel therethrough.

DETAILED DESCRIPTION OF A PREFERRED EMBODIMENT

Figure 1:
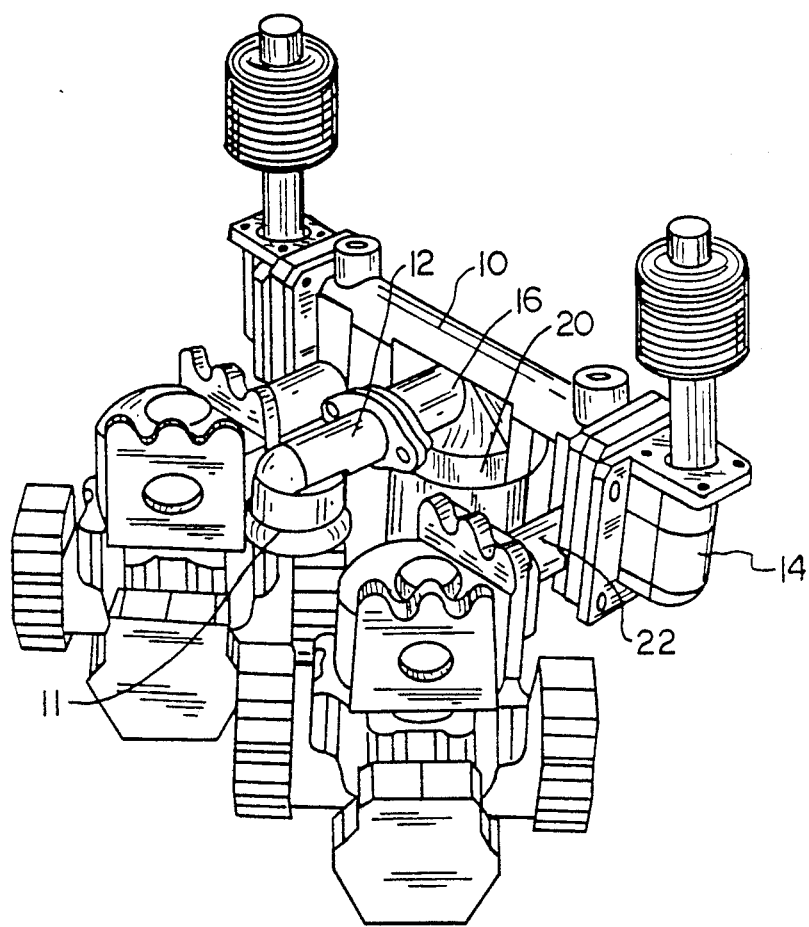

Turning now to the drawings, there is illustrated in FIG. 1, a fuel filter mounting support 20 in a typical environment. In the illustrated embodiment, fuel is conveyed by pumps (not shown) into a fuel receiving manifold 10 through a manifold inlet 11 and a delivery conduit 12.

The fuel filter mounting support 20 is mounted in the path of the incoming fuel and includes a delivery conduit 16 having a flange at the terminal end thereof which connects the delivery conduit 16 to the aforementioned conduit 12. A replaceable and disposable fuel cartridge 22 is releasably attached to the mounting support 20 as illustrated in FIGS. 1 and 2.

So arranged, fuel is delivered from storage tanks (not shown) to the fuel cartridge 22. Depending upon which of the valves 14 is operating, the fuel may come from selected tanks and be of a selected type. In any event, the fuel must be filtered prior to transmission to the dispenser nozzle (not shown). The incoming fuel is delivered through conduits 12 and 16 to the filter mounting support 20, from which it enters the fuel cartridge 22, is filtered, and returned through a separate series of passageways (FIG. 2) in the mounting support 20. The fuel is then delivered through manifold 10 and flow control valves 14, from whence it is transmitted to the dispenser nozzles in a conventional manner.

The above manifold and conduit system is merely exemplary of one type of system that delivers fuel to a fuel filter cartridge. There are many other types of fuel or oil or even fluid systems in which the fluid must be filtered and with which the present invention is intended for use. The heart of the present invention is, therefore, in the construction of the mounting support 20 and the manner in which it protects the environment surrounding the fuel cartridge from uncontrolled expulsion of fuel and/or vapors.

Figure 2:
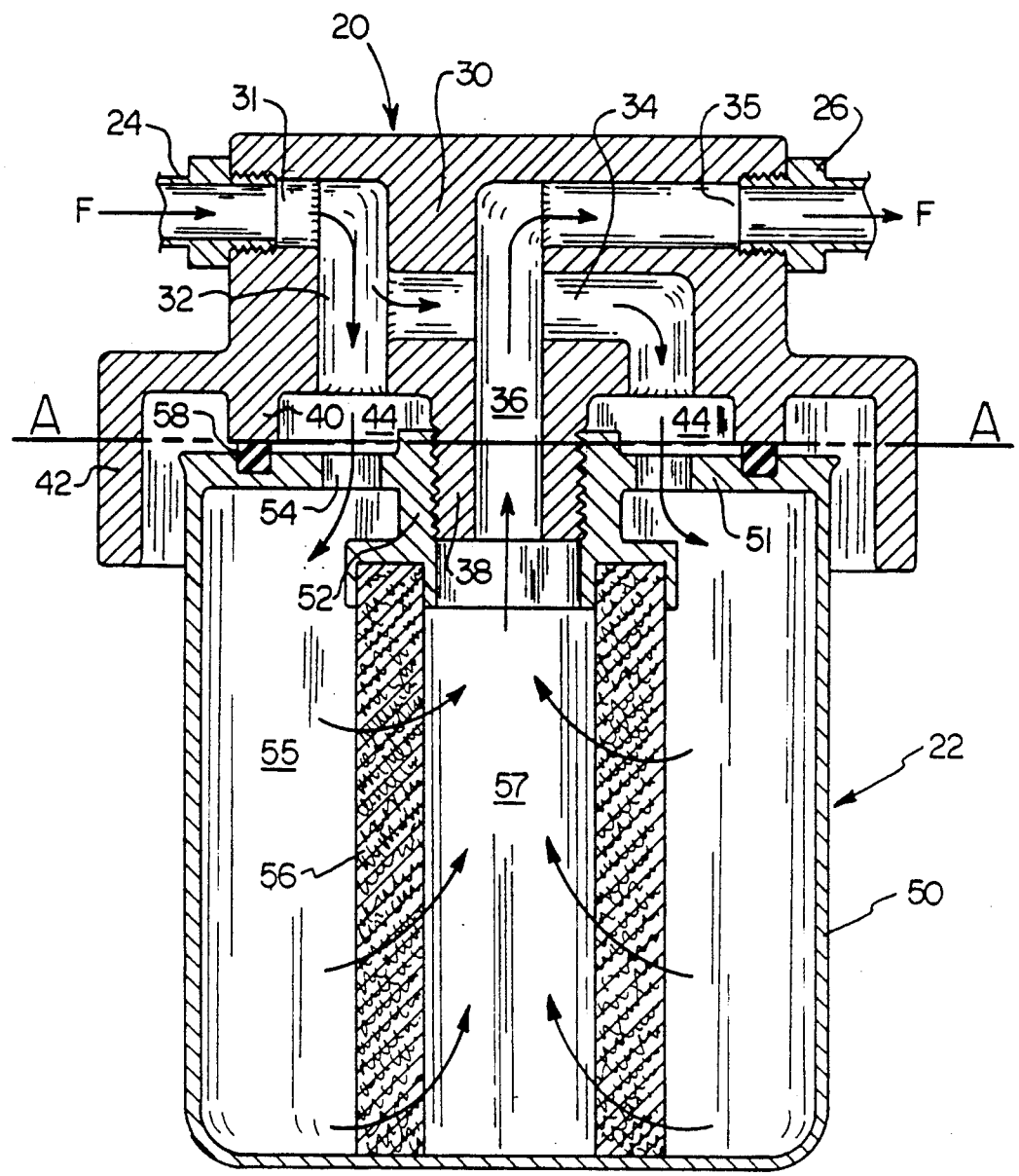

Turning now to FIG. 2, the mounting support 20 is better described. The mounting support 20 includes a generally cylindrical body portion 30 that includes an inlet port 31 which receives one end of an inlet conduit 24. Body portion 30 also includes an outlet port 35 which receives the adjacent end of a filtered fuel return pipe 26.

Internally of the body member 30, one or more passageways 32,34 connect the inlet port 31 with the lower surface of body member 30. Similarly, a return passageway 36 extends through an externally threaded, cylindrical attachment lug 38 to provide a pathway for the filtered fuel through the body member 30 to the outlet port 35, from whence it is returned to the return pipe 26.

A generally circular ridge 40 extends downwardly from the undersurface of housing 30 at a point radially outside the point where inlet passageways 32 intersect the lower surface of body member 30 for reasons to be described hereinafter. Finally, a peripheral skirt 42 extends around the outer periphery of body member 30 for reasons to be described hereinafter.

The aforesaid mounting support 20 is substantially permanently installed within the plumbing or conduits of the fuel delivery system. The filter cartridge 22 to be described hereinafter is temporarily assembled to mounting support 20. After a period of use, a filter cartridge 22 will become clogged and unusable, whereupon upon it must be removed and replaced by a new cartridge.

As illustrated in FIG. 2, the filter cartridge 22 includes a normally but not necessarily cylindrical housing 50 including an upper wall 51 which includes an internally threaded tubular portion 52 which provides means for attaching the filter cartridge 22 to the threaded lug 58. The upper wall 51 also includes one or more openings 54 which allows fuel delivered from passageway 32,34 to enter the filter housing 50. A cylindrical sheet of filter media 56 extends downwardly throughout the housing 50 and divides the interior thereof into an outer annular compartment 55 and an inner cylindrical compartment 57. The unfiltered fuel enters the outer compartment 55, passes through the filter media 56 to the inner compartment 57, from whence it returns through return passageway 36 as described hereinabove.

An annular seal 58 is mounted in an annular groove in the upper wall 51 at a point radially outwardly of said inlet ports 54. Seal 58 is formed of rubber or elastomeric material so cooperates with the upper wall 51, the annular ridge 40, and the underside of housing 30 as to provide an annular sealed compartment 44 which connects the passageways 32,34 with the inlet ports 54 of the fuel cartridge 50. The seal 58 prevents loss of fuel through the interface A—A between peripheral ridge 40 and seal 58.

The aforementioned peripheral flange 42 then extends downwardly from the periphery of the cylindrical body portion 30 to a point below the interface A—A. So arranged, should the service station operator inadvertently loosen the filter cartridge 22 if the fuel supply to the filter cartridge is pressurized, skirt 42 will deflect any fuel or vapors escaping between the ridge 40 and seal 58 until the fuel supply can be shut off or the filter cartridge retightened. The escaping fuel can then easily be collected by a pan or other collection device in the dispenser below the fuel filter assembly.

While a preferred embodiment of the invention has been described in detail hereinabove, it is apparent that various changes and modifications might be made to the configuration of the mounting support 20 without departing from the scope of the present invention which is set forth in the accompanying claims.

What is claimed is:

1. A fuel filter mounting support for connecting a filter cartridge to a fuel dispenser, said filter cartridge being of the type which includes in an upper wall a central, internally threaded tubular portion which provides egress for fuel filtered in said cartridge back into said mounting support and a plurality of openings in the upper wall surrounding said tubular portion which provide an entrance for fuel from said support into said cartridge, said support comprising:
 (a) a housing having means for attachment to a fuel conduit means and including an ingress port for the ingress of fuel to be filtered and egress port for delivering filtered fuel back to said conduit means;
 (b) a first passageway extending internally of said housing for providing communication for fuel between said ingress port and an outlet means on a lower surface of said housing which is operative communication with said plurality of openings;
 (c) a second passageway extending internally of said housing between a return inlet means for filtered fuel on the lower surface of said housing which is in operative communication with said central tubular portion and said egress port;
 (d) attachment means extending downwardly from a central portion of the lower surface of said housing at a point aligned with said central tubular portion for releasably connecting said filter cartridge to said housing in such a position that entering unfiltered fuel is passed through said first passageway downwardly through said plurality of openings into said fuel cartridge, through a filter media therein, and back up through said central tubular portion into said second passageway from whence it flows through said second passageway;
 (e) an annular ridge protruding downwardly from said lower surface along a path lying radially outward of said attachment means, said plurality of openings and said outlet means, against which said filter cartridge may be sealed when assembled; and
 (f) a peripheral skirt extending downwardly from said housing below the point at which the lower surface of said housing is engaged by an assembled fuel cartridge for diverting escaping fuel and vapors downwardly should said filter cartridge be inadvertently loosened if the fuel supply to the filter cartridge is pressurized.

* * * * *